United States Patent [19]

Van Kattenbroek

[11] 4,261,158

[45] Apr. 14, 1981

[54] RECEIVING DEVICE FOR BRUISABLE OBJECTS

[75] Inventor: Hendrik J. Van Kattenbroek, Barneveld, Netherlands

[73] Assignee: Moba Holding Barneveld B.V., Barneveld, Netherlands

[21] Appl. No.: 902,165

[22] Filed: May 2, 1978

[30] Foreign Application Priority Data

May 3, 1977 [NL] Netherlands .................... 7704836

[51] Int. Cl.³ .................... B65B 5/04; B65B 5/08
[52] U.S. Cl. .................... 53/248; 193/32; 414/80
[58] Field of Search .................... 53/248, 261; 193/32; 414/80, 81

[56] References Cited

U.S. PATENT DOCUMENTS

| | | | |
|---|---|---|---|
| 1,837,765 | 12/1931 | Dunkley | 193/32 X |
| 2,956,384 | 10/1960 | Underwood | 53/248 X |
| 3,001,350 | 9/1961 | Heblij | 53/261 X |
| 3,470,990 | 10/1969 | McNenny | 193/32 X |
| 3,673,756 | 7/1972 | Prete et al. | 53/248 X |
| 4,003,185 | 1/1977 | Goff | 53/248 X |

*Primary Examiner*—Horace M. Culver
*Attorney, Agent, or Firm*—Larson, Taylor and Hinds

[57] ABSTRACT

A receiving device for bruisable objects having obliquely and downwardly extending receiving members, which can yield downwardly and outwardly and a pivot mechanism for pivoting at least one receiving member downwardly and outwardly, a restriction member being provided for retarding or hampering the movement of the receiving member and for moving in unison with the receiving member when a pivot mechanism pivots the receiving and restriction member in unison.

4 Claims, 5 Drawing Figures

RECEIVING DEVICE FOR BRUISABLE OBJECTS

The invention relates to a receiving device for bruisable objects, such as eggs, provided with two obliquely and downwardly extending receiving members, which can yield downwardly and outwardly, and a pivot mechanism for pivoting at least one receiving member downwardly and outwardly.

Such a device has been described in the Dutch Patent Specification No. 131,526.

Though such a receiving device in many cases worked very well, it has appeared that with objects of relatively strongly differing dimensions and weights it may happen, that either a big object remains standing i.e., does not move, as desired, or that a small object falls too readily through the receiving mechanism. With sorting devices, with which only objects, for instance eggs, of a predetermined weight class have to be received this problem hardly presents itself. If, however, eggs or other objects with more widely differing dimensions and weight classes have to be handled, such as for instance in the automatically discharge of eggs from laying batteries in which case big and small eggs may be present, or with mechanically handling of other objects with possibly differing dimensions and weights, such as fruit, it has been shown that not always a satisfactory functioning can be obtained.

The invention aims to improve a device of this type in a simple and efficient way, such that this difficulty is overcome.

Accordingly it is provided according to the invention that each receiving member is completed by at least one restriction member, said receiving member being provided with a means, which after the receiving member has moved in a predetermined measure downwardly and outwardly, engages a means of the restriction member, such that both members can only yield in unison, and in that the pivot mechanism is adapted to pivot the receiving member and the restriction member in unison.

Preferably the receiving members and the restriction members are pivotable about a horizontal axis, which axis can be in common for operating receiving and restriction members. The same shaft can also serve the purpose of supporting the pivot mechanism.

A preferred embodiment of the invention is characterized by a horizontal shaft on which a pivot mechanism, a receiving member and a restriction member are pivotably mounted, the receiving member and the restriction member being provided with counter weights that oppose yielding in the downwardly and outwardly direction, an abutment of the pivot mechanism preventing pivot movement of the restriction member in the direction opposite to downwardly and outwardly yielding, an abutment of the restriction member preventing pivot movement in the direction of downwardly and outwardly yielding of the receiving member with respect to the restriction member, the receiving member being able to pivot about a restricted angle with respect to the restriction member before the one or the other of last mentioned abutment of the restriction member prevent this, the pivot mechanism being provided with an abutment preventing downwardly and outwardly pivot movement of the restriction member with respect to the pivot mechanism, a driving means for the pivot mechanism being present for causing it to pivot by means of its abutment the restriction member in the downwardly and outwardly direction.

The invention in the following is elucidated by way of the drawing, in which.

Figure 1:
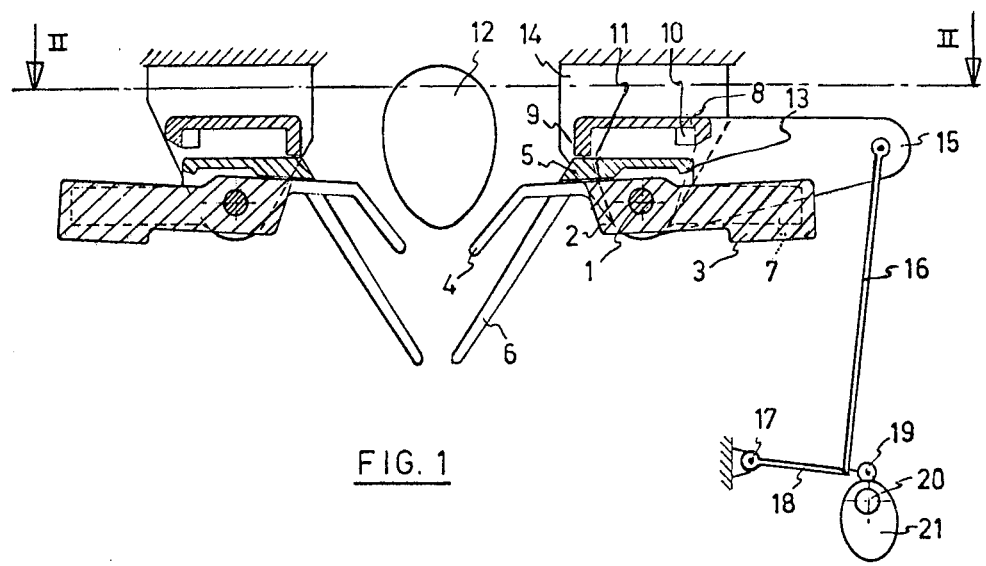
FIG. 1 shows a sectional view of a receiving member with restriction member and pivot member according to the invention.
Figure 2:
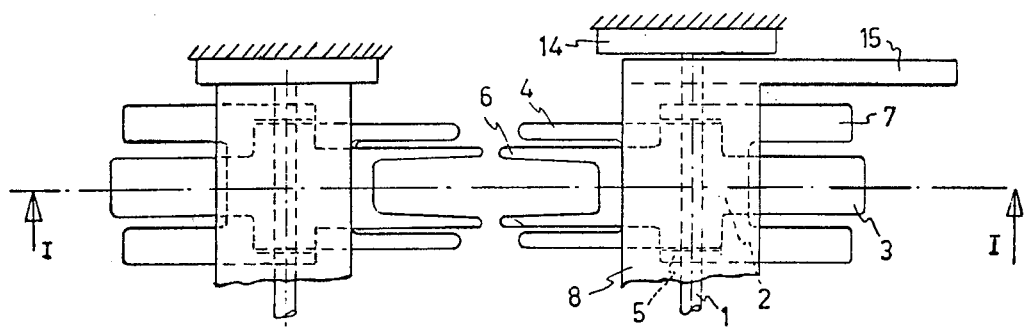
FIG. 2 is a plan view of FIG. 1.

In the drawing with reference 1 a central shaft has been indicated, which is supported by supports 14 and to which the receiving member 2 has been pivotably mounted. The receiving member has at its one side a counter weight 3 and at its other side receiving fingers 4. On the same shaft a restriction member 5 is pivotably mounted, having restriction fingers 6 and counter weights 7. Further on the same shaft a pivot mechanism 8 has been mounted that is provided with an abutment 9 normally engaged by the restriction member 5 by influence of its counter weight 7. Further the pivot mechanism 8 is provided with an abutment 10.

The restriction member 5 itself is provided with an abutment surface 11 which is engaged by receiving member 2 under influence of the counter weight 3. Of course on the shafts 1 an unlimited number of such devices may be applied the one behind the other. In practice this is for instance for handling eggs to put them in egg trays a number of six.

Figure 3:
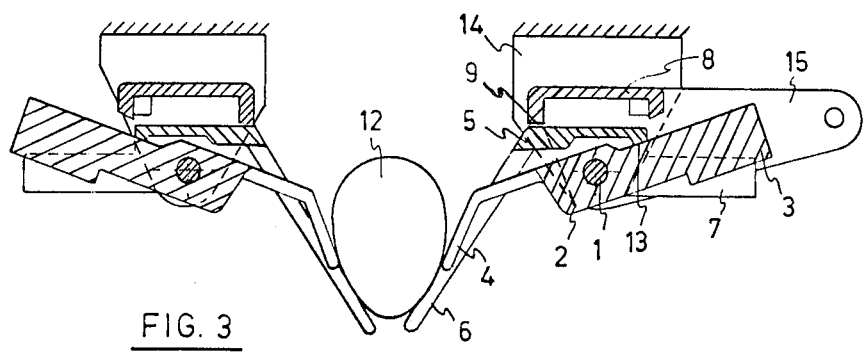
FIG. 3 shows the same device, after the receiving members have been made active.
Figure 4:
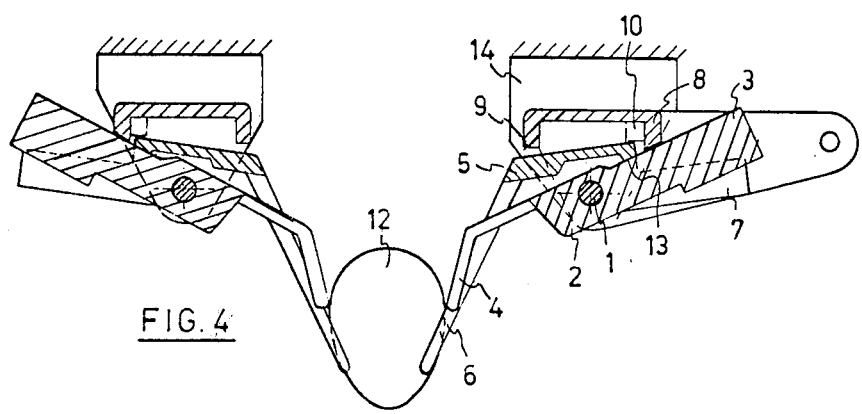
FIG. 4 shows the same device, after the restriction members have also been made active.

If now an egg, indicated with 12, falls downwardly, it first engages the receiving member 4, that is pivoted. By reason of this the member engages a further abutment 13 of the restriction member. The abutments 11 and 13 are applied in such a way, that the receiving member 2 can carry out a restricted pivot movement with respect to the restriction member 5. At the end of the movement of the receiving member 2 with respect to the restriction member 5 the position of FIG. 3 has been reached. Now the receiving member and the restriction member can pivot somewhat further in unison unto the position shown in FIG. 4, in which the abutment 10 engages the restriction member 5, so that both restriction member 5 and receiving member 2 are locked.

Figure 5:
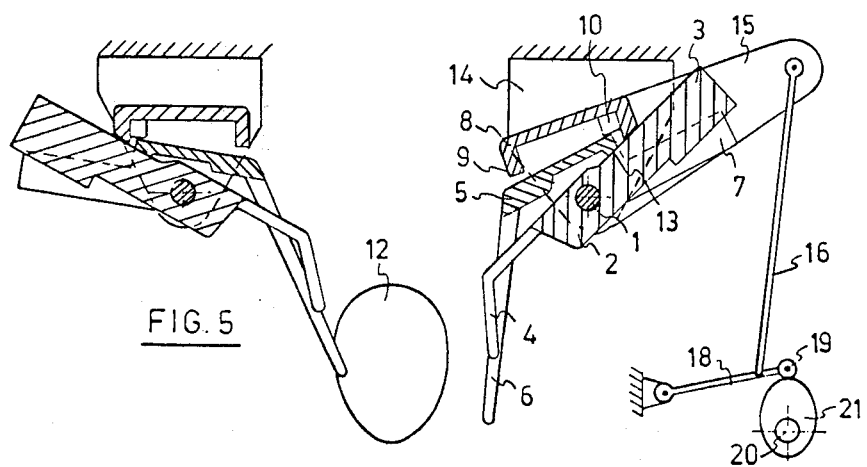
FIG. 5 finally shows the device after the pivot mechanism has been made active.

FIG. 5 finally shows the situation in which one of the pivot members, to wit the right hand one, is pivoted about the shaft 1. Herewith the abutment 10 gives play, whereas the abutment 9 if necessary causes the restriction member 5 to pivot.

It will be clear that it only is important that first the receiving member becomes active and afterwards the restriction member. By reason of this a light smooth braking can be obtained with the receiving member and a stronger braking with the restriction member, which is dependent on the counter weights one choses for these members. With a greater braking force the receiving member and restriction member pivot still further on until this pivot member is opposed by the abutment 10. If this abutment pivots the receiving member and the restriction member pivot with it, on the one hand because the abutment 10 yields and on the other hand because the abutment 9 can become active, so that the objects can slide downwardly with a velocity that is controlled by the movement of the pivot member 8. A further advantage of the invention is, that the receiving member well centers small objects, for instance eggs, and that bigger objects are centered by the restriction member. Also the underside of big and small eggs practically come on the same level.

In the drawing has been shown, that the pivot member 8 with aid of an arm 15 is connected to the shaft 1. The arm 15 is connected to a link 16 that at 16 is connected to a swayable arm 18, with which a follow roller 19 rests on a cam 21 that is rotatable about the axis 20. Herewith it should not be overlooked that the pivot member 8 needs only to be supported at its outer ends and can be in common for a complete row of receiving and restriction members.

Of course it is not necessary that the receiving and restriction members have the form of fingers indicated in the drawing. To be sure it presently appears to be favorable that, as indicated specially in FIG. 4, the receiving member by means of abutment 13 engages the restriction member the fingers 4 and 6 of the receiving and restriction member engage the object 12 in about the same way.

An important application of the invention is putting eggs in egg-trays from a lay battery. These eggs may have widely differing dimensions and after they have been put in rows of six by hand or with a mechanism known per se and have been let down above the device according to the invention, they can be smoothly received. After this time is available to pivot the pivot mechanism 8 for letting the eggs down. After pivoting back of mechanism 8, a new row of eggs is received and the egg-tray, in which the row of eggs have been received is, in the meantime, shifted, one row further on.

What I claim is:

1. A receiving device for bruisable objects, such as eggs, said device comprising first and second receiving members each having an obliquely and downwardly extending part; means for pivotably mounting said receiving members for pivoting in a pre-determined direction; at least one restriction member associated with each of said receiving members, said restriction members being pivotably mounted and each including an obliquely and downwardly extending part; each receiving member and the restriction member associated therewith having abutment parts disposed to so as to engage each other upon pivoting of the receiving member; abutment means for limiting the pivoting movement of the restriction member; and a controllable pivot means for moving the abutment means so as to allow at least one said receiving member and the associated restriction member to pivot together further in said pre-determined direction.

2. A device according to claim 1, wherein said first receiving member and the restriction member associated therewith are both pivotable about a first axis and said second receiving member and the restriction member associated therewith are pivotable about a second axis.

3. A device according to claim 1, wherein said abutment means is mounted on a member which is pivotably mounted for rotation about an axis on which a said at least one receiving member is mounted.

4. A receiving device for bruisable objects, said device comprising first and second horizontal shafts, first and second receiving members respectively mounted on said first and second shafts and each having an obliquely and downwardly extending part; first and second restriction members respectively mounted on said first and second shafts and each having an obliquely and downwardly extending part; the receiving member and the restriction member which are mounted on the same shaft including abutment parts for limiting the pivoting movement of that receiving member with respect to that restriction member; a pivot member having an abutment for cooperation with said first restriction member being mounted on said first shaft; and means for pivoting said pivot member about said first shaft to move said abutment.

* * * * *